United States Patent [19]

Angle et al.

[11] Patent Number: 5,848,257

[45] Date of Patent: Dec. 8, 1998

[54] METHOD AND APPARATUS FOR MULTITASKING IN A COMPUTER SYSTEM

[75] Inventors: Richard L. Angle, Wellesley; Edward S. Harriman, Jr., Bedford; Geoffrey B. Ladwig, Chelmsford, all of Mass.

[73] Assignee: Bay Networks, Inc., Santa Clara, Calif.

[21] Appl. No.: 717,404

[22] Filed: Sep. 20, 1996

[51] Int. Cl.$^6$ .................................................. G06F 9/38
[52] U.S. Cl. ............................................................ 395/395
[58] Field of Search ........................ 364/DIG. 1, DIG. 2; 395/395, 390, 391, 392, 393, 561, 800.01, 376, 381, 670, 671, 672; 711/1, 100

[56] References Cited

U.S. PATENT DOCUMENTS 5,465,373  11/1995  Kahle et al. .............................. 395/391
5,530,816  6/1996  Holt ......................................... 395/391

*Primary Examiner*—Robert B. Harrell
*Attorney, Agent, or Firm*—Blakely Sokoloff Taylor & Zafman, LLP

[57] ABSTRACT

A multitasking computer system having multiple parallel and independently executing processors. Each processor has multiple pipeline stages. Each stage in the pipeline can be simultaneously executing a process. More processes than the sum of pipeline stages for all processors exist at any given time, which allows processes to migrate between processors and allows the processes queued at any one processor to increase, i.e., back up, momentarily without causing other processors to sit idle. Related to the ability to support at least as many processes as there are the sum of pipeline stages in all of the processors is the ability of the preferred embodiment of the present invention to migrate processes between processors. When a processor completes execution of an instruction for a particular process, the program counter for the process is incremented to point to the next instruction in the process. The process is then requeued by a scheduler. A instruction fetch unit fetches the next instruction and associated arguments, if any, and dispatches the process to the same or other processor for execution of the next instruction in the process. Thus, a process can migrate from one processor to another processor.

16 Claims, 2 Drawing Sheets

METHOD AND APPARATUS FOR MULTITASKING IN A COMPUTER SYSTEM

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of computer system architecture. More specifically, the present invention is related to a multitasking computer system architecture supporting multiple independent, specialized, loosely coupled processors. The architecture provides a novel approach to scheduling processes for execution on one of the multiple processors, migrating processes between the processors, rescheduling of processes upon a cache miss, and distributing memory along pipeline stages in the processors. The computer system architecture is particularly optimized for operations related to data packet switching as may be performed by an International Standards Organization (ISO) Open Systems Interconnection (OSI) Layer 2 (i.e., media access control sublayer—MAC) based network switching device, i.e., a switching hub, in a data communications network. The architecture is further applicable to operations related to routing as may be performed by an ISO Layer 3 (i.e., network layer) based network device.

2. Description of the Related Art

Introduction

In the prior art, a switching hub typically is designed around a computer system having a single processor. The computer system is controlled by software optimized to receive and transmit data packets between local or wide area network segments in a data communications network. As an optimized computer system, the prior art switching hub is generally comprised of the same components as a general purpose computer system, including a central programmable processor, an internal control bus, a data bus, and shared common memory controlled by the central programmable processor. Additionally, the prior art switching hub has a plurality of media access controllers (MACs), each having an associated port coupled to one of the local or wide area network segments.

A prior art switching hub may be further optimized, for example, by introducing memory subsystems and input/output (I/O) devices particularly suited for processing data packets. However, by definition, a general purpose computer system is not designed with a particular application, such as data packet switching, as the primary application. As a result, a switching hub based on a general purpose computer system generally does not fully utilize the capabilities of the computer system. Moreover, the maximum data packet processing throughput of the switching hub is limited by the general purpose computer system architecture. In general, in order for a particular application to be performed by a computer system as quickly, inexpensively and efficiently as reasonably possible, what is needed is a computer system architecture designed to optimize the operations performed by the computer system to carry out a particular application. In particular, what is needed is an improved computer system architecture that is designed to facilitate the extremely high data packet processing rates required by a high performance switching hub.

Overview of Switching Hub Functions vs. General Purpose Computer System Functions A brief overview of some of the needs of and functions typically performed by a switching hub as opposed to the functions generally performed by a general purpose computer system will now be discussed. The overview serves to further identify the need for an improved computer system for use in a switching hub.

Latency and Throughput

A switching hub primarily performs data packet processing. A switching hub "switches" data packets from one network segment to another network segment. That is, the switching hub receives data packets on a port coupled to a network segment, internally processes the data packet, and transmits the data packet out a port coupled to a different network segment. Data packet processing is very I/O intensive relative to the processing performed by a general purpose computer system. A switching hub may process data packets at very high rates. At these high rates, there is no long or medium term temporal locality of data because all the data (in the form of data packets) enters the switching hub and shortly thereafter leaves the hub. Furthermore, data packets received by the hub are generally independent of each other. Thus, traditional parallel processing techniques are more readily applied to data packet processing within the hub.

The volume of data packets switched by a switching hub is a very important factor when considering the performance of the hub. However, the time required to process a particular data packet is not as critical. In other words, latency, i.e., the delay in switching a data packet, is not so important a consideration as overall data packet throughput. This factor, combined with the fact that data packets are generally independent of each other, means it is not so important what task is being performed by the switching hub so long as that at least some task is being performed at any given time.

However, a primary goal in the design of a general purpose computer system is to reduce instruction latency. To this end, a computer system uses well known pipeline techniques in an attempt to reduce the clock cycle time and thereby improve throughput. When using these techniques, each instruction executed by a general purpose computer system generally requires the results from the immediately preceding instruction. As a result, such systems typically incorporate a bypassing or feedforward technique, in which an instruction at a stage in the pipeline receives its arguments sooner than it would otherwise. However, introducing these techniques adds stages to the pipeline. While adding stages allows for a decrease in the clock cycle time of the system, introduction of the bypass logic requires the clock cycle time to be increased to allow time for the bypass logic to operate. What is needed is a computer architecture where each instruction in a pipeline is being executed for a different independent process so that the instructions do not depend on the preceding one or more instructions in the pipeline, thus obviating the need for bypass logic and allowing the ability to provide simpler and deeper, i.e., longer pipelines.

Temporal Locality

Most general purpose computer systems assume data have several properties, including temporal and spatial locality. Temporal locality refers to the notion that once a data item is accessed, it will generally be accessed again relatively soon. Thus, most general purpose computer systems have general registers which provide an extremely fast (and small) cache for recently accessed, i.e., important, data. Indeed, most general purpose computer systems require specific instructions to load data into or store data maintained in these general registers. While there is overhead associated with performing a load or store instruction, the overhead is minimal in most computing environments. In a switching hub environment in which data packet processing is the primary function, the load and store instructions can comprise a large percentage of the overall instruction stream in many cases. What is needed, then, is a means by which the need to load and store data in a general register is eliminated.

Temporal locality strongly influences the design of cache memory in most general purpose computer systems. As the size of the cache grows, it effectively increases the time scale for temporal locality. Larger caches allow the general purpose computer system to retain recently used data for a longer period of time in the relatively faster cache, thereby improving the average speed of retrieving and processing the data. However, in a switching hub environment, there is generally no long term temporal locality for a data packet, because once the data packet has been processed, it is no longer of interest. Thus, relatively large caches generally do not increase the performance of switching hubs. What is needed is an improved architecture for use in a switching hub in which a small cache is provided.

Spatial Locality

As applied to general purpose computer systems, spatial locality refers to the notion that if a data item is accessed in memory, there is a strong correlation that other data stored nearby in memory will also be accessed. Based on this concept, computer system architectures have been designed with large cache lines and provide for "move multiple" instructions. Prior art computer system architectures have been limited to ensure cache lines are not too large because there is a point at which larger cache lines not only increase hit rates (i.e., the rate a which data is found in the cache) but also increase miss penalties (i.e., the costs associated with not finding the data in the cache). In a switching hub environment, however, there generally is a even stronger relationship between nearby data items. Thus, what is needed is a computer system architecture for use in a switching hub in which larger cache lines are utilized than would be reasonable in most general purpose computer system architectures.

Program Size

The majority of general purpose computer system application programs require extremely large text spaces. In other words, the current application programs provided for prior art general purpose computers are large and generally getting larger with each new release or revision. Indeed, some commercially available programs comprise millions of lines of "code" or instructions. Thus, the computer architect must provide an extremely large memory address space in which to store the instructions to be executed.

It is well known that in addition to data, instructions have temporal and spatial locality. An instruction cache is generally utilized rather than providing sufficient very fast memory. A data packet processing application program, on the other hand, generally comprises a relatively smaller number of instructions, typically in the thousands. Further, an instruction cache is generally of no use in a data packet processing environment unless the cache is large enough to hold an entire program because each data packet received by a switching hub is typically processed differently than a previously received data packet, especially in a multiprotocol, heterogeneous data communications networking environment. Thus, what is needed is a computer system architecture optimized for a data packet processing application program as may be utilized by a switching hub, in which an entire data packet processing application program can reside within a single memory device such as a static random access memory (SRAM) device which is sufficiently fast in fetching the instructions comprising the data packet processing application program.

Performing Lookup Operations

In a switching hub, one of the most common operations of the system is to look up data in a table. For example, in mapping a MAC address to a source or destination port number, a switching hub uses the MAC address as a key to index into a table of port numbers. It can be appreciated that, depending on the size of the network and the number of end stations coupled to the network in which the switching hub is installed, the size of the example table could be very large, containing conceivably hundreds of thousands of entries or records. Due to the frequency of the operation, and the possible number and size of tables in the switching hub, looking up, i.e., searching for, an entry in a table is a critically important function. Thus, what is needed is a method of searching for an entry in a table by which even the smallest delay in performing the search is minimized to avoid the compounding effect of a delay when repeatedly performing the search operation.

SUMMARY OF THE INVENTION

Disclosed is a multitasking computer system architecture supporting multiple independent, specialized, loosely coupled processors. The architecture schedules processes for execution on one of the multiple processors, migrates processes between the processors, reschedules processes upon the occurrence of a cache miss, and utilizes distributed memory along pipeline stages in the processors. The architecture is particularly optimized for operations related to data packet switching as may be performed by a switching hub in a data communications network.

BRIEF DESCRIPTION OF THE DRAWINGS

The present invention is illustrated by way of example and not limitation in the following figures. Like references indicate similar elements, in which.

DETAILED DESCRIPTION OF THE EMBODIMENTS OF THE INVENTION

Described is a multitasking computer system architecture having multiple independent, specialized, loosely coupled processors. The architecture provides for scheduling processes for execution on one of the multiple processors, migrating processes between the processors, and rescheduling of processes upon a cache miss. Additionally, the architecture utilizes memory distributed along pipeline stages in the processors. The architecture is particularly optimized for operations related to data packet switching as may be performed by a network switching device, i.e., a switching hub, in a data communications network.

In the following description, numerous specific details are set forth in order to provide a thorough understanding of the present invention. It will be apparent, however, to one of ordinary skill in the art that the present invention may be practiced without these specific details. In other instances, well-known standards, structures, and techniques have not been shown in order not to unnecessarily obscure the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 1:
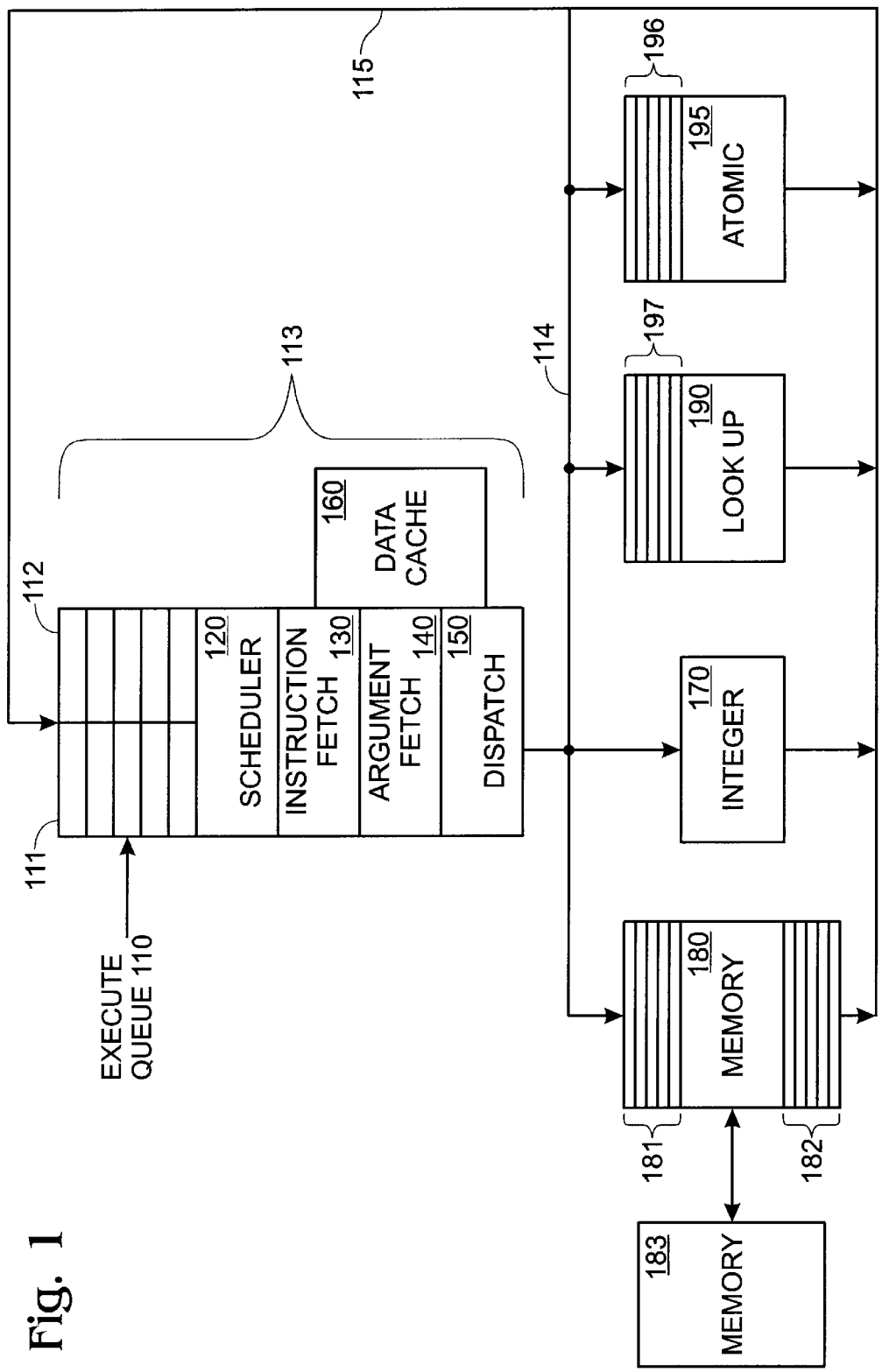
FIG. 1 is a block diagram of a preferred embodiment of the present invention.

Embodiment of the Present Invention
Overview of Operation of the Preferred Embodiment With reference to FIG. 1, the preferred embodiment of the present invention is a multitasking multiprocessor. In particular, the preferred embodiment comprises a plurality of specialized processors, e.g., processors 170, 180, 190 and 195, which multitask between a plurality of concurrently executing processes. Each processor performs a specific and relatively narrow set of operations such as arithmetic operations or memory access operations in accordance with and as controlled by a process.

The state of each process is specified by a set of registers, referred to as the process' context. In the preferred embodiment, each process context has between 16 and 32 general registers, 4 pointer (address) registers, a program counter (PC), and a condition flag. Importantly, as each process executes independently of all other processes, the state of each process is independent of the state of all other processes.

Figure 2:
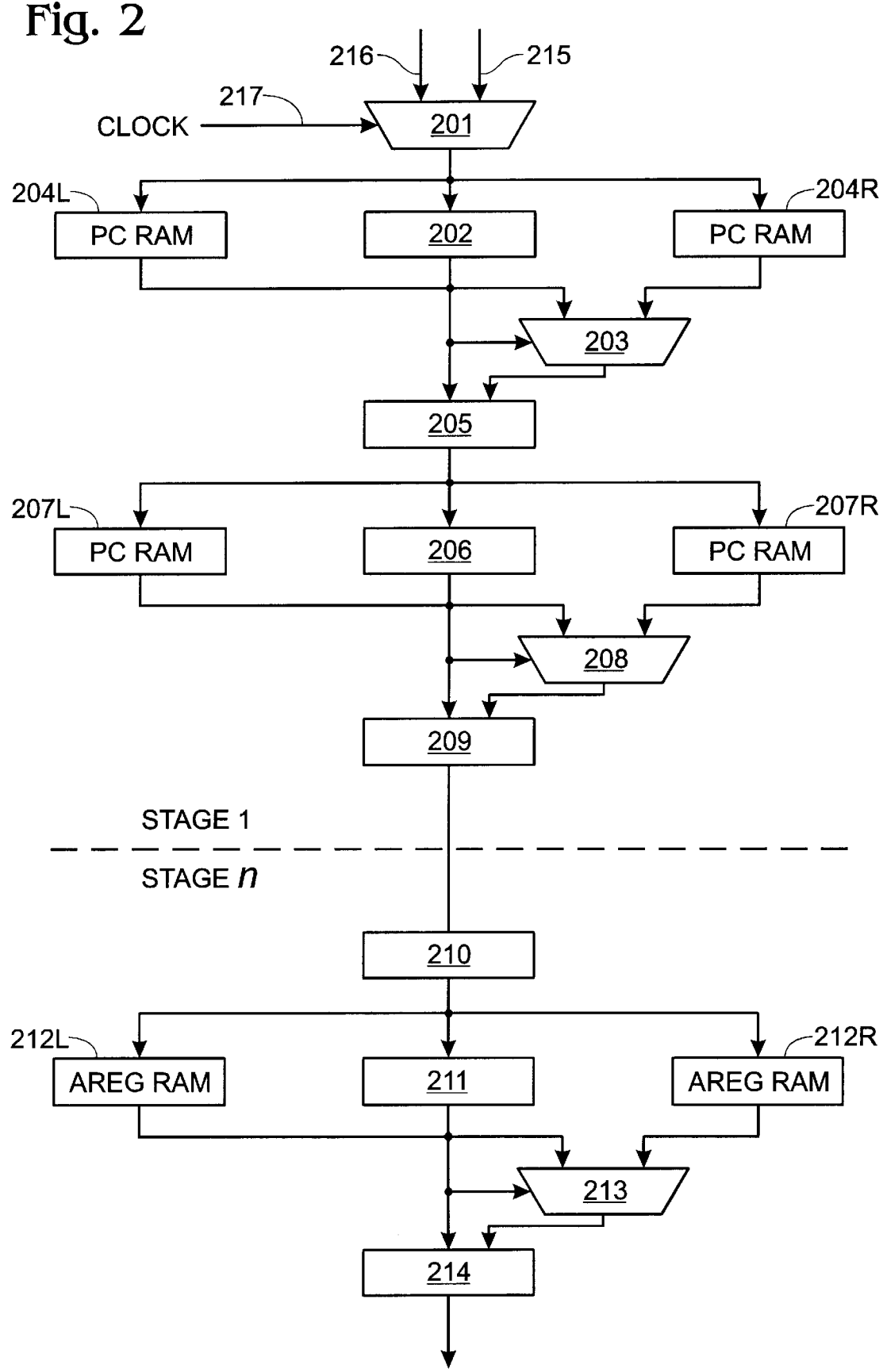
FIG. 2 is a block diagram of a preferred embodiment of the present invention.

With reference to FIG. 2, the processors each comprise execution pipelines made up of a plurality of stages. FIG. 2 illustrates an execution pipeline 200, or simply, pipeline 200, for a processor. The pipeline comprises, for example, a series of registers 202, 205, 206, 209, 210, 211, 214, etc., coupled in communication. In one embodiment of the present invention, the registers are D flip-flops.

A series or group of one or more registers within the pipeline represent a stage. For example, registers 202, 205, 206 and 209 comprise stage 1, while registers 210, 211 and 214 comprise stage n.

Each stage of the pipeline for a given processor is executing a different, independent process. This configuration allows each processor a set of processes to execute concurrently, at different stages within the processor's execution pipeline. Of course, the set of processes operated on by a processor changes dynamically. Moreover, more processes than pipeline stages exist at any given time, as described below, which allows processes to migrate between processors and allows the processes queued at any one processor to increase, i.e., back up, momentarily without causing other processors to sit idle. For example, when many processes are queued at input queue 181 for execution by the memory processor 180, other processes continue to be executed by the other processors 170, 190, and 195.

It is important to note that although the preferred embodiment of the present invention provides for four processors executing concurrently as shown in FIG. 1, it is appreciated that the computer architecture embodied by the present invention is scalable. In other words, any number of conceivable processors may be coupled as illustrated in FIG. 1.

The multitasking computer system embodied by the present invention further comprises a prefetch unit 113, which, in turn, comprises execute queue 110, scheduler 120, instruction fetch 130, argument fetch 140 and dispatcher 150. The scheduler 120 maintains a list or queue of processes that are ready to be executed. More accurately, the scheduler 120 maintains a list of process identification (PID) numbers, wherein each PID is associated with a process. This list is maintained in a first in first out (FIFO) order in an execute queue 110. Every clock cycle, the scheduler dequeues a PID from the execute queue 110 and passes the PID to an instruction fetch unit 130. The instruction fetch unit 130 receives the PID and reads the program counter (PC) for the associated process. The instruction fetch unit 130 then reads a single instruction from a program store (not shown in FIG. 1) at a location pointed to by the PC and transfers the instruction to an argument fetch unit 140. The argument fetch unit 140 decodes the instruction and reads the arguments specified in the instruction. The arguments may refer to general registers associated with the process or memory locations. The argument fetch unit communicates with the data cache 160 to determine whether the arguments are immediately available via cache. The argument fetch unit 140 then transfers the arguments along with the associated instruction to the dispatcher 150. The dispatcher 150 examines the instruction and the state of cache 160 to determine to which processor the instruction should be transferred for execution. If cache 160 indicates that an argument is needed from memory 183 (i.e., the argument is not present in cache) the instruction fails, i.e., the instruction is not executed by a processor.

When an instruction fails because an argument is not present in data cache 160, the instruction is forwarded to a memory processor 180 via internal bus 114, wherein the memory processor 180 reads the appropriate cache line containing the needed argument from memory 183. Upon completion of performing the read of the cache line, memory processor 180 requeues the process in execute queue 110 so that the instruction can be processed again by the scheduler 120, instruction fetch unit 130, argument fetch unit 140 and dispatcher 150 in prefetch unit 113. If after processing the instruction a second time, the prefetch unit 113 determines all the arguments are present in data cache 160, the instruction is sent to the appropriate processor for execution via internal bus 114.

If the instruction specifies the operation to be executed is an arithmetic operation, such as an add operation, the process identification (PID), the instruction, and the arguments associated with the instruction are transferred to the integer processor 170 via internal bus 114. If the operation to be executed is a memory access operation, e.g., a load or store, then the instruction is forwarded to the memory processor 180. Likewise, if the operation is an atomic operation, then the instruction is delivered to the atomic processor 195.

Upon an instruction being dispatched to an appropriate processor, that processor is responsible for completing the operation indicated by the instruction, updating the state (i.e., the registers) of the process, and requeuing the process back to the execute queue 110 maintained by the scheduler 120.

As discussed above, the preferred embodiment of the present invention is envisioned as operating in a switching hub in a data communications network. In that environment, latency is not a key issue; rather, data packet throughput is of primary importance. Due to the fact that there are many processes available for execution, combined with the fact that latency is not of primary consideration, it is not of critical importance that any one instruction in a process be executed quickly. As a result, the present invention may utilize a greater number of pipeline stages in the prefetch unit 113 and processor to which an instruction is transferred. For example, in the preferred embodiment of the present invention, the prefetch unit (including the scheduler, instruction fetch, argument fetch, and dispatcher) and integer processor combine to provide eighteen pipeline stages.

In general, although the preferred embodiment supports a long execution pipeline for each processor, each stage in the pipeline is operating on behalf of a unique and independent process. Thus, there is no need for bypassing whereby results from a stage in the pipeline are fed back to a preceding stage in the pipeline. Likewise, feedforward, where a stage in the pipeline is fed an argument before the associated instruction is received by the stage in the pipeline, is not necessary. This greatly simplifies the logic at and between each pipeline stage in a processor.

Processes vs. Pipeline Stages

The preferred embodiment of the present invention supports more processes than the sum of all pipeline stages in all the processors. The exact number of processes actually supported is primarily a function of the depth of the execute queue 110. By supporting more processes than the sum of pipeline stages in all of the processors combined, the processors continually have processes waiting in their respective input queues to be executed. By overloading, i.e., outnumbering, the processors with processes at any given instant, the processors generally always have processes queued for execution and generally do not sit idle, thus improving overall computer system performance. The greater the depth of the execute queue, the greater the number of processes supported by the architecture embodied by the present invention, and the greater the number of processes queued by each of the individual processors for execution. This ensures that each stage in a pipeline of a processor is executing a process at all times.

For example, the lookup processor 190 executes the lookup instruction. The lookup instruction generally takes a number of clock cycles to complete execution as it passes through the execution pipeline of the lookup processor. Thus, when the dispatcher 150 hands a process to the lookup processor, the lookup processor is busy for a period of time thereafter, executing the lookup instruction. By providing an input queue 197 to the lookup processor, dispatcher 150 can dispatch an additional process (or processes) to the lookup processor for execution of the lookup instruction. The process remains in the lookup processor's input queue 197 until the first stage in the execution pipeline of lookup processor 190 is ready to accept the process from its input queue 197.

Migration of Processes Between Processors

Closely related to the ability to support at least as many processes as there are the sum of pipeline stages in all of the processors is the ability of the preferred embodiment of the present invention to migrate processes between processors. With reference to FIG. 1, a feedback path is provided by bus 115. When a processor completes execution of an instruction for a particular process, the program counter for the process is incremented to point to the next instruction in the process. The process is then requeued by scheduler 120 in execute queue 110. Prefetch unit 113 fetches the next instruction and associated arguments, if any, and dispatches the process to the same or other processor for execution of the next instruction (or same instruction, in the case of a cache miss) in the process. Thus, a process can migrate from one processor to another processor.

For example, when a cache miss occurs in the prefetch unit 113 when fetching either an instruction or an argument, dispatcher 150 sends the process to the memory processor 180 so that the appropriate cache line can be read. When memory processor 180 completes the read of the cache line from memory 183, the process is requeued to execute queue 110. The prefetch unit again fetches the same instruction and associated arguments. If the instruction and all associated arguments are present in cache, the dispatcher 150 delivers the process to the appropriate processor. If another cache miss occurs, the dispatcher again sends the process to the memory processor to perform another read of the appropriate cache line.

Instruction and Data Set

The preferred embodiment of the present invention utilizes a relatively simpler instruction set, but a more sophisticated data set, than the prior art. The basic instruction set includes:

| Instruction Set | |
| --- | --- |
| Instruction | Operation |
| add | adds two numbers |
| subtract | subtracts two numbers |
| and | performs Boolean AND of two numbers |
| or | performs Boolean OR of two numbers |
| move | moves data from one register/memory location to another |
| shift | shifts a number a specified number of places left or right |
| add_complex | adds two complex numbers |
| load | reads the contents of a memory location into a register |
| store | writes the contents of a register into a memory location |
| atadd | atomically adds to a memory location |
| atdeli | waits for a memory location to be equal to a specified value |
| lookup | searches for a key in a table |
| branch | branches to a segment of code specified by an address |

The data set comprises the following as shown in the table below. Each of the data items is first class, meaning the data items can be manipulated directly.

| Data Set | |
| --- | --- |
| Data Item | Definition |
| Dn | A general purpose register. In the preferred embodiment, there may be 16 to 32 general purpose 64-bit registers. |
| An | A pointer register. In the preferred embodiment, there may be 4 32-bit pointer registers. |
| M | A memory location pointed to by a pointer register. |
| [field] | any contiguous bit field of a D or A register, or M memory location. |

As provided by the instruction and data sets shown above, the contents of a memory location can be manipulated directly. Thus, there is no need for a load and store instruction when memory is being accessed. Furthermore, accessing memory is no slower than accessing a general purpose register. This functionality is supported by a caching method discussed below and by encoding the M operands within an instruction rather than through the use of instruction extensions.

The preferred embodiment of the present invention is able to encode a memory operand within an instruction because the typical offset from an A register is small enough to be specified by three bits. This is so because in a data packet processing environment, a data structure for storing a data packet is generally less than 50 bytes. Since memory is 64 bits wide, it is the exception when an offset of a memory operand from the A register is more than eight words, which can be specified by three bits. Each address register A effectively maps eight memory locations onto a flat register space. If an instruction specifies D0, then the general register D0 is used. If the instruction specifies A0[0] then the first word in memory starting at the memory location specified by A0 is used.

Cache

As discussed above in connection with the prior art, having a cache to take advantage of temporal locality is of less importance in the computer system embodied by the present invention for use in a switching hub. However, spatial locality is relevant to the data packet processing environment and is, therefore, the underlying rationale for the use of cache in the preferred embodiment.

The cache in the preferred embodiment is small, for example, on the order of 64 to 128 bytes, due to the fact that the working set of data, i.e., the header information in a data packet, is on the order of tens of bytes or less in size. In one embodiment, the data cache 160 provides for storage of four cache lines for each process, where each cache line is 32 bytes wide. The lines may be allocated and discarded using a least recently used algorithm. Moreover, the cache lines are fully associative.

Allocation Policy

As in the case of a general purpose computer system, the preferred embodiment of the present invention relies on the fact that nearby data items in memory are often times related. Thus, there is a strong correlation that if a data item is read from memory, a nearby data item in memory will likely also be read. Similarly, writing a data item into a data packet is a strong indication that additional data nearby in memory will be written into the data packet as well. Based on this fact, the preferred embodiment of the present invention utilizes an allocate on write caching policy so that a copy back cache can be used to improve memory throughput.

An allocate on write policy is burdensome in a general purpose computer system architecture because it typically reads the cache line before performing a write into the cache due to the fact that only a cache line may be dirty rather than an individual word or bytes. An allocate on write policy is desirable if multiple writes to the same cache line occurs, but is undesirable if isolated writes generally occur. However, in a data packet processing environment, the write spatial locality is a much stronger relationship than in a general computing environment. As a result, an allocate on write policy is the most appropriate policy. Furthermore, a data packet processing application benefits from a larger cache line than does a general purpose computing application.

Cache State

In a data packet processing application program, if a data item is written to a cache line that has not previously been read, the line should be allocated because additional writes are highly likely. Further, and more importantly, it is very likely that no data will be read out of the cache line in which case the allocate should not read the line from memory. Moreover, it is very likely that the entire cache line will be written.

The cache in the preferred embodiment of the present invention maintains a number of cache lines. The state for each of the cache lines is maintained as well. Each cache line in the preferred embodiment is 32 bytes. Each byte can be in one of three states: invalid, indicating the data is meaningless; valid, indicating the byte can be read and has not yet been written; and dirty, indicating the byte can be read and has already been written.

When a read misses in the data cache 160, the cache line is read from memory and all bytes are marked valid. When a write misses, the cache line is allocated but not read from memory, and only those bytes actually written are marked as dirty. Then, when the cache line is pushed out of the cache, only those bytes marked as dirty are actually written to memory 183.

Even though the preferred embodiment of the present invention provides a relatively small cache for each process, the cache represents a significant fraction of the SRAM space needed to maintain the state of the process. Moreover, the cache allocated to each process is generally more than needed in most situations. Combined with the fact that the preferred embodiment of the present invention has a relatively large number of processes executing concurrently, it is possible to take advantage of a low rate of cache utilization.

Rescheduling a Process Upon a Cache Miss

In prior art general purpose computer systems, when a cache miss occurs, the execution of the central processor is generally stalled until memory is accessed and the appropriate page from memory is placed in the cache. Unlike the prior art, when the preferred embodiment of the present invention experiences a cache miss in the prefetch unit 113, for example, when two cache lines are accessed and one is missing, the process is passed off to the memory processor 180, which executes a read of the missing cache line in memory 183. While the process is in an input queue 181 waiting to be executed by memory processor 180, or executing in memory processor 180, or in output queue 182 waiting to be requeued in the execute queue 110 by scheduler 110, the prefetch unit continues to dispatch other processes from the execute queue to the other processors. Thus, the computer system, including the processors, do not stall. Processors continue to execute processes. The prefetch unit continues to dispatch processes. When the memory read is completed, the process in which the cache miss occurred is rescheduled by the scheduler. The instruction and argument fetch units again attempt to fetch and decode the instruction and arguments. If another cache miss occurs, the process is again dispatched to the memory processor. Upon reading the cache line, the memory processor again sends the process to the execute queue via bus 115, where it is rescheduled by the scheduler.

Memory Interface

The memory processor 180 interfaces with memory 183. Memory processor 180 receives load, store, and cache requests from dispatcher 150 as described above. Also as described above, when a process requires a memory read, the process identification (PID) of the process is transferred to the memory processor and the process is not considered for execution by the scheduler 120 until the memory operation is completed. Furthermore, so long as there are processes not waiting to access memory, the scheduler 120 continues to dequeue other processes to the instruction fetch unit 130. Thus, a long latency for a process when accessing memory does not stop any other process from executing on another appropriate processor.

In the preferred embodiment of the present invention, because the prefetch unit 113 and processors 170, 190 and 195 operate significantly faster than the external memory processor 180, requests from the dispatcher 150 are queued in the memory processor's queue 181 as shown in FIG. 1. The final status and data read are queued in a status queue 182. Status is queued because the memory processor 180 may execute a series of load instructions and the prefetch unit and other processors may not be able to satisfy the write backs immediately. Because memory operates at a different speed than the processors, queues 181 and 182 provide an asynchronous boundary between the memory and the processors. Additionally, memory and the lookup and atomic processors share the same write port to the D registers. The queues 181 and 182 provide memory a place to store results when the port is in use by the processors. It is important to note that the number of operands (i.e., request and status replies) can not be more than the number of processes supported by the architecture embodied by the present invention. Thus, the same SRAM is used for both queues 181 and 182.

Finally, since the architecture embodied by the present invention is latency tolerant, the queues between the memory processor (or other processors) and the prefetch unit provide an asynchronous boundary between the processors and clock domains to allow the architecture the ability to optimize the clock frequency of the processors independently of the memory access speed.

Atomic Processor

The atomic processor 195 provides for execution of an atomic operation, such as atomic add (atadd) as discussed above. An atomic operation synchronizes the operations performed by the multiple processors. While most data packets are independent of one another, there are cases where synchronization between processing of data items in a data packet processing environment is necessary. For example, if many data packets need to go out a single transmit I/O channel, the processes must cooperate when controlling that channel. Additionally, there is occasionally the need to order data packets. If two data packets arrive at the same input port of a switching hub and are destined for the same output port of the switching hub, the data packets should be transmitted out the output port in the same order in which they were received. Thus, while the processing of each data packet is independent, the ultimate queuing of the data packets for transmission out the output port is not independent. The atdeli instruction provides for this functionality.

Lookup Processor

The lookup processor 190 executes the lookup instruction to find a key in a table. More specifically, the lookup instruction finds a sequence of symbols comprising a key in a table. As an example, if the prefetch unit 113 examines an instruction and the state of the cache and determines the instruction is a lookup instruction, it sends the instruction to the lookup processor 190. The execution of the lookup instruction results in a key being found, or a key not being found. If the key is not found, the process is requeued by the scheduler 120 on the execute queue 110, with the program counter pointing at the instruction immediately following the lookup instruction. For example, given the instruction sequence:

lookup D0, D1

<next instruction> the lookup processor searches for a key specified in register D0 in a table in the memory of the computer system, wherein the starting address of the table is pointed to by register D1. If the lookup processor executing the lookup instruction does not find the key, the scheduler requeues the process in which the lookup instruction was executed, and the next instruction in the process following the lookup instruction is fetched by the instruction fetch unit 130. Additionally, any arguments associated with the next instruction are fetched by the argument fetch unit 140, and the dispatcher 150 sends the next instruction to the appropriate processor for execution.

In the event the key is found in the table, the entry in the table associated with the key contains the memory address of the next instruction to be executed. This memory address is loaded into the program counter (PC) associated with the process in which the lookup instruction was executed. Thus, if the key is found, the result of the lookup instruction is to provide a memory address to be loaded into the PC, causing the process to jump to an instruction at the specified memory location in the process and continue execution of the process.

In a switching hub, one of the most common operations is to look up data in a table. For example, in a switching hub connected to heterogeneous data networks transmitting data packets according to multiple protocols, data packet processing in the switching hub involves, among other things, determining the format of a data packet received on an input port of the switching hub. The lookup instruction described above is used to branch to the appropriate portion of code for processing the data packet. Below is a simple example of a routine for determining the format of a data packet and branching to the appropriate code for processing the data packet:

```
;determine packet format
;register A0 points to the memory location in which the data packet is
stored
load    pkt_frmat_tbl_base,   ;load the ptr to a table of keys into D1
        D1
lookup  A0[format], D1        ;search the format table using the field
                              "format" from the data packet as the
key
   <unrecognized format>
   .
   .
   .
packet_format_0:
   <instructions related to processing packet of format 0>
packet_format_1:
   <instructions related to processing packet of format 1>
packet_format_2:
   <instructions related to processing packet of format 2>
   .
   .
   .
```

The lookup processor 190 searches for a key in a table using a novel radix search method as described in U.S. patent application Ser. No. 08/690,225 entitled, "METHOD FOR STORING A TABLE OF KEYS IN A MEMORY OF A COMPUTER SYSTEM," r filed on Jul. 19, 1996. As described in more detail therein, the radix search method traverses a tree data structure searching for a sequence of symbols comprising the key. The search continues until a symbol in the sequence of symbols is not found, in which case the search fails, or the end of a key is found, in which case the search is considered successful.

The end of a search is detected when the last symbol in the sequence of symbols comprising the key is found. The last symbol has associated with it a memory address of a program code segment to which to vector execution of the process. The memory address is placed in the program counter. The process is then requeued on the execute queue, where the scheduler 120 dequeues the process and the dispatcher 150 transfers the process to the appropriate processor for execution of the instruction pointed at by the program counter.

Searching for Keys of Arbitrary Width

In the manner described above, the preferred embodiment of the present invention can search for keys of arbitrary width by repeatedly executing lookup instructions on the lookup processor. As stated above, the lookup processor 190 executes a lookup instruction to find a key in a table. When the scheduler dequeues a process from the execute queue 110, if the next instruction to be executed in the process is the lookup instruction, the prefetch unit 113 transfers the process to the lookup processor 190. The execution of the lookup instruction results in a key being found, or a key not being found. If the key is not found, the process is requeued by the scheduler 120 on the execute queue 110, with the program counter for the process pointing to the instruction immediately following the lookup instruction, i.e., the next instruction.

In the event the key is found in the table, the entry in the table associated with the key contains the memory address of the next instruction to be executed. This memory address is loaded into the program counter (PC) register associated with the process in which the lookup instruction was executed. The scheduler requeues the process, later dequeues it, and the instruction pointed to by the PC register is fetched by the instruction fetch unit 130. Additionally, any arguments associated with the instruction are fetched by the argument fetch unit 140, and the dispatcher 150 sends the process to the appropriate processor for execution of the next instruction. In this way, a branch to any instruction in the process can be performed.

Importantly, the instruction pointed to by the PC register can be another lookup instruction in the process. In this way, multiple lookup instructions can be sequentially executed, each specifying a different portion of a key of arbitrary width, or each specifying a particular key in a sequence of keys being searched for. Thus, for example, if the maximum size key that the lookup instruction can process is 32 bits in length, a 64 bit key can be searched for in a table by sequentially executing two lookup instructions, each processing 32 bits of the key: the first lookup instruction, if it finds the first portion of the key, specifies the memory address of a second lookup instruction to execute. The process is rescheduled and dispatched again by the prefetch unit to the lookup processor wherein the second lookup instruction is executed to find the second portion of the key.

The same technique can be applied to finding a sequence of keys. The first lookup instruction is executed by the lookup processor. If the lookup processor finds the first key, the lookup instruction returns a memory address specifying the next instruction to be executed by the process. The memory address is loaded in to the program counter and the process queued in the execute queue 110. The prefetch unit fetches the next instruction and its associated arguments (a lookup instruction, a key value to search for, and the base address of the table) and dispatcher forwards the process again to the lookup processor. The lookup processor executes the second lookup instruction to find the second key, and so on.

The ability of the prefetch unit and lookup processor of the preferred embodiment of the present invention to iteratively dispatch and execute lookup instructions in this manner enables the ability to search for a key of arbitrary width or to search for a sequence of keys. This ability to search for a key of arbitrary width or to search for a sequence of keys is particularly useful in a switching hub, for example, when performing data packet filtering on multiple fields in the data packet or when searching for large keys, e.g., a 128 bit IP address, in which the key size is greater than that which can be searched for in the execution of a single lookup instruction.

Distributed Memory Architecture

In addition to the main memory 183, each processor has its own memory, strategically distributed along the stages of an execution pipeline of the processor, to provide fast access to often used information, such as the contents of the A and D registers, the program counter, etc.

When a processor executes an instruction, it must first access the program counter (PC) to determine the next instruction to be executed. The processor then might, for example, access A or D registers as required according the argument associated with the instruction pointed at by the program counter. After executing the instruction, the processor may store the result in an A or D register, and increment the program counter. Thus, it is readily apparent that certain memory locations, e.g., memory locations providing storage for registers, may be repeatedly accessed by each instruction in a process. The processor may access these memory locations in the initial stage of execution and carry the contents of the PC, A and D registers with the process as it moves through subsequent stages of the execution pipeline. Using this approach, if memory access times are slow relative to the clock cycle time of the execution pipeline, the pipeline may stall while waiting for a memory access (either a read or a write) to complete.

Alternatively, a processor may access the information in the registers on an as needed basis, i.e., at the moment in time that the information is required to continue instruction execution. Here, too, if the access time of the memory is such that the execution pipeline must wait before continuing execution of the instruction, the pipeline may stall. Moreover, depending on the physical location of the memory locations in which often needed data is stored, a further delay might be incurred when accessing memory.

The preferred embodiment of the present invention strategically locates memory storage in close physical proximity to a stage in an execution pipeline at which memory is commonly or repeatedly accessed. For example, with reference to FIG. 2, a block diagram of a processor execution pipeline 200 is illustrated. The processor execution pipeline illustrated in FIG. 2 is indicative of the execution pipeline embodied by any of the processors in the preferred embodiment of the present invention. Coupled to the pipeline at various stages are small memory cells for storing information that is consistently and repeatedly requested at that stage in the execution pipeline. For example, memory cells 204L, 204R, 207L and 207R are physically located in close proximity to stage one of the pipeline. The memory cells are used, for example, as a PC register for storing a program counter. In stage one, the program counter is read to determine the memory address in memory 183 of the instruction to be executed by the processor. Memory cells 204L or 204R provide a random access memory (RAM) cell for the PC register. The memory cells are immediately available to stage one of the processor's execution pipeline due to their physical proximity to stage one, thus increasing the speed with which the memory access of often used information is performed. Likewise, memory cells 207L and 207R provide access to another register. Alternatively, memory cells 207L and 207R provide access to the same PC register as cells 204L and 204R, but via a different port, so that the execution pipeline has immediate access to the PC register at a latter point within stage one of the execution pipeline.

As another example, memory cells 212L and 212R each represent a RAM cell for an A register. The A register is accessed by stage n of the pipeline, thus, the memory cells are situated in close physical proximity to stage n.

Even/Odd Memory Contexts

The speed of the execution pipeline in a processor is critical to overall performance of the processor and the computer architecture of the present invention as a whole. To that end, the clock cycle time at which the pipeline is operated is increased as much as the operating characteristics of the logic and associated circuitry will allow. Generally, access times for memory are slower than the clock cycle times at which the pipeline logic can operate. Thus, there is a point of diminishing return at which increasing the clock cycle time of the pipeline is less advantageous if the pipeline must wait for memory access to complete. Thus, the preferred embodiment of the present invention provides two sets of strategically located memory cells distributed along the execution pipeline of a processor, and alternately accesses the memory cells.

With reference to FIG. 2, a first set of even memory cells is shown by memory cells 204L, 207L and 212L. Each of the even memory cells have an odd counterpart, 204R, 207R and 212R, respectively. As processes are dispatched to the processor, the process identification (PID) associated with the process determines whether the odd or even set of memory cells is accessed by the pipeline as the process moves along the pipeline. If the PID is an odd number, the odd set of memory cells is accessed. If the PID is an even number, the even set of memory cells is accessed.

An example of the operation of the pipeline utilizing the even/odd memory cells follows. As discussed above, each process has a process ID (PID). The execute queue 110 in FIG. 1 is divided into two separate queues—an odd execute queue 111 and an even execute queue 112. As processes are queued by the scheduler 120, they are placed into either the even or odd execute queue according to the PID associated with the process. If the PID associated with a process is even, the process is queued in the even execute queue 112. Likewise, if the PID associated with a process is odd, the process is queued in the odd execute queue 111.

The prefetch unit 113 dispatches processes from the dispatcher 115 in an even/odd fashion. That is, a process having an even PID is dispatched, then a process having an odd PID is dispatched, then a process having an even PID is dispatched again, and so on. Indeed, bus 114 is actually two buses in the preferred embodiment. One bus is the even bus, and a second bus is the odd bus. Both buses form the connections shown by bus 114 in FIG. 1.

With reference to FIG. 2, a multiplexer 201 at the top of a processor's execution pipeline receives both buses. Input 216 is coupled to the even bus, while input 215 is coupled to the odd bus. The selector input 217 on multiplexer 20 is driven by the clock signal so that each clock cycle, a different input is selected, thereby forwarding processes on to the pipeline in an even/odd manner.

As discussed above, each process has it's own context, i.e., it's own set of A and D registers, it's own program counter (PC), etc. The context is loaded into the memory cells strategically located near the appropriate stages of the execution pipeline that is currently executing the process. If the process has an even PID, the context for the process is stored in the even memory cells. If the process has an odd PID, the context for the process is stored in the odd memory cells. As a process moves through a pipeline, the PID associated with the process is passed from register to register, from stage to stage, so that the pipeline knows whether to access the appropriate even or odd memory cells provided.

For example, with reference to FIG. 2, the PID associated with a process moves through execution pipeline registers 202, 205, 206, and so on. At register 205, the contents of the PC are loaded into the pipeline. Multiplexer 203 determines, based on the PID, which memory cell, 204L or 204R to access. If the PID associated with the process currently being processed in stage one is even, the selector input to multiplexer 203 signals the multiplexer to select the input coupled to memory cell 204L. If the PID is odd, the selector input selects the input coupled to memory cell 204R. Likewise, the PID passed on to multiplexer 208 and register 209 is used to select memory cell 207L or 207R for input into register 209 via multiplexer 208. Stage two shows a similar configuration for accessing the contents of an A register associated with a process and placing the contents in register 214.

Even though the preferred embodiment utilizes two sets of identical memory cells in the pipeline for even and odd processes to account for the delay incurred in accessing a memory cell, registers 202, 206 and 211 act as place holders in the pipeline since the memory access time and delays incurred by the logic in selecting the appropriate memory cells prevent the contents of the memory cells being immediately available to the next register in the pipeline.

Conclusion

There are, of course, alternatives to the described embodiment which are within the understanding of one of ordinary skill in the relevant art. The present invention is intended to be limited only by the claims presented below.

We claim:

1. A multitasking computer system having a plurality of parallel processors, a scheduler for scheduling a plurality of processes among the plurality of parallel processors, a dispatcher for dispatching the plurality of processes to the plurality of processors, the plurality of processors each having at least one pipeline stage, comprising:

a process queue having n entries, the process queue maintained by the scheduler wherein n entries is greater than the sum of the pipeline stages for the plurality of processors.

2. The multitasking computer system of claim 1, wherein the entries are queued in the process queue on a first in first out basis.

3. The computer system of claim 2, wherein the plurality of parallel processors requeue a process on the process queue.

4. The computer system of claim 3, wherein each of the plurality of processes are executed by the plurality of processors independently of each other.

5. The computer system of claim 4, wherein each pipeline stage in one of the plurality of processors executes one of a plurality of processes simultaneously.

6. The computer system of claim 5, wherein one of the plurality of processes is requeued by one of the plurality of processors after executing a first instruction and dispatched to another one of the plurality of processors for execution of a second instruction.

7. A computer system comprising:

n processors, the n processors each having multiple pipeline stages;

a scheduler for scheduling processes for the n processors, the scheduler having a process queue whose depth provides for queuing a greater number of processes than the sum of the multiple pipeline stages of the n processors.

8. The computer system of claim 7 wherein the n processors execute processes in parallel.

9. The computer system of claim 8 wherein a first process executes independently of a second process.

10. The computer system of claim 8 wherein the queue is a first in first out queue.

11. The computer system of claim 7 wherein one of n processors executes a process at each of the pipeline stages simultaneously.

12. A computer system comprising:

n processors, the n processors each having multiple pipeline stages wherein each pipeline stage for a given one of the n processors concurrently executes an instruction from a different independent process;

a scheduler for scheduling processes for the n processors, the scheduler having a process queue whose depth provides for queuing a greater number of processes than the sum of the multiple pipeline stages for the n processors.

13. The computer system of claim 12 wherein the n processors execute instructions for independent processes in parallel.

14. The computer system of claim 12 wherein the process queue is a first in first out queue.

15. A multitasking computer system having a scheduler for scheduling a plurality of processes, a dispatcher for dispatching the plurality of processes, comprising:

a plurality of processors each having a plurality of pipeline stages, wherein each of the plurality of pipeline stages for a given one of the plurality of processors concurrently executes a different, independent process;

a process queue maintained by the scheduler that queues a plurality of processes, wherein the plurality of processes is greater than the sum of the pipeline stages for the plurality of processors.

16. The multitasking computer system of claim 15, wherein the entries are queued in the process queue on a first in first out basis.

* * * * *